Figure 1:
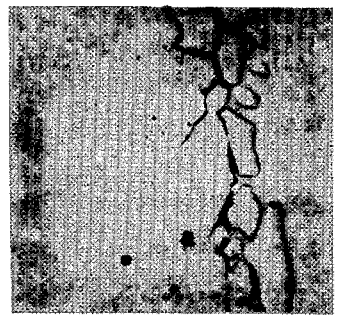

Jan. 4, 1955 PUN KIEN KOH 2,698,813
PROCESS OF SILVER BRAZING CHROMIUM STAINLESS STEEL
Filed July 26, 1952

INVENTOR
PUN KIEN KOH
BY
ATTORNEY

United States Patent Office 2,698,813
Patented Jan. 4, 1955

2,698,813

PROCESS OF SILVER BRAZING CHROMIUM STAINLESS STEEL

Pun Kien Koh, Tarentum, Pa., assignor to Allegheny Ludlum Steel Corporation, Brackenridge, Pa., a corporation of Pennsylvania Application July 26, 1952, Serial No. 301,152

5 Claims. (Cl. 117—50)

This invention relates to brazing and in particular to the silver brazing of chromium stainless steel.

In many industrial applications of stainless steel and in particular chromium stainless seeel of the 430 type or 430 titanium type having from 14 to 18.5% chromium, considerable difficulty has been encountered in silver brazing the chromium stainless steel. The conventional silver solder such as those known to the trade as "ETX," having a composition of 50% silver, 34% copper and 16% zinc, or "Easy Flo 50," having a composition of 50% silver, 15.5% copper, 16.5% zinc and 18% cadmium, and others failed to bond to such stainless steels when applied in any known manner. Such bonds failed completely in 4 to 10 days when tested in humidity (95% humidity—95° F.) or in water submersion.

In attempting to overcome such failure to silver solder chromium stainless steel, modifications in the composition of the brazing solder by additions of nickel thereto have been made in the expectation that when such silver solders are deposited on such stainless steel surface there will be an interchange of nickel at the interface which makes the interface more passive and prevents corrosion from occurring. However, even with such nickel additions to the brazing solder it has been found that the resulting deposit of solder was not homogeneous, the edges of such deposited brazing solder being deficient in nickel and lifting free from the chromium stainless steel surface to which the solder is applied.

An object of this invention is to provide for silver soldering chromium stainless steel.

Another object of this invention is to provide for so conditioning chromium stainless steel as to facilitate the making of a strong, adherent silver brazed joint therewith.

A further object of this invention is to provide, in a process of silver soldering chromium stainless steel, cold rolled strip having a smooth bright surface finish, for so treating or conditioning the stainless steel strip as to render it susceptible for receiving silver solder in an adherent bonding relation.

A more specific object of this invention is to provide, in a process of silver soldering chromium stainless steel cold rolled strip having a smooth bright surface finish, for effecting an intergranular oxide penetration of the surface of the strip at the area of the joint and thereafter removing the intergranular oxides to condition the surface of the strip to obtain an intergranular penetration of the chromium stainless steel by the silver brazing solder when such silver solder is applied thereto.

Figure 2:
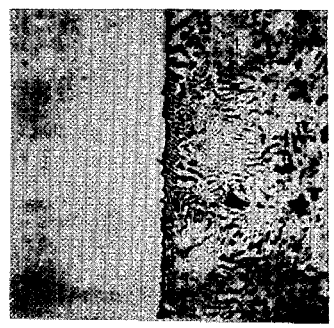
Figure 3:
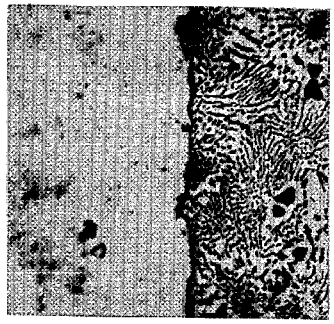
Figure 4:
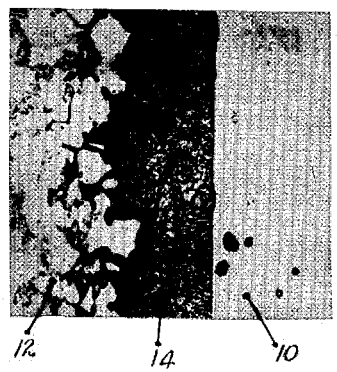

Other objects of this invention will become apparent when taken in conjunction with the accompanying drawings in which:

Figure 1 is a photomicrograph at a magnification of 250 times illustrating the effects of one phase of the treatment of this invention as applied to chromium stainless steel, Figures 2 and 3 are photomicrographs at a magnification of 500 times illustrating silver soldered joints with chromium stainless steel as produced in accordance with this invention utilizing different oxidizing treatments of the chromium stainless steel, and Figure 4 is a photomicrograph at a magnification of 500 times illustrating a silver soldered joint formed between two pieces of bright finish chromium stainless steel strip, one of which is treated in accordance with this invention and the other of which is untreated.

This invention is applicable to all chromium stainless steels having a chromium content of from 14 to 19% and higher with or without nickel in amounts of from .25 to 14% and other usual constituents, the steel being in the form of strip as thin as .008" (about 35 gauge) up to plate thickness and which has a smooth bright surface finish as bright as that known to the industry as BB finish which is exceedingly smooth and bright.

In practicing this invention the chromium stainless steel is subjected to heat at a temperature of not less than 1700° F. in an oxidizing atmosphere such as air to effect an oxidation of the surface to be brazed and an actual intergranular oxide penetration thereof and is then air cooled. The method of heating is not critical and can be accomplished in a number of different ways. For example, where an entire surface of the stainless steel is to be brazed the steel strip or sheet or plate can be heated in an air furnace. On the other hand if a localized brazing of the steel is to be effected then localized heating of the area to be brazed can be accomplished by means of torch heating or by means of high frequency induction heating.

The heating of the surface to be brazed of the chromium stainless steel in the oxidizing atmosphere is so controlled as to provide an intergranular oxide penetration of the surface thereof to a minimum depth of not less than 0.00025". Usually the depth of the intergranular penetration will be substantially greater than 0.00025", although experiments have proven that such minimum penetration is sufficient to give a strong adherent bond with the silver solder when further treated as explained hereinafter. The time of heating the chromium stainless steel to effect the minimum critical intergranular penetration will, of course, depend upon the thickness of the chromium stainless steel which is to be brazed.

Where an air furnace is employed for heating the thin gauge (.020" thick) type 430 stainless sheet products, a time of 20 minutes at 1800° F. has been found to be satisfactory. It will, of course, be appreciated that as the heating temperature is increased from the critical lower temperature of 1700° F., the time required to effect the necessary intergranular penetration in the air furnace is decreased. On the other hand if torch heating of a localized area is to be effected, the area is first preferably marked with a suitable temperstick to indicate a predetermined heating temperature and a brazing torch having a short oxiding flame is employed with the flame directed on to the area to be heated. A time of only a few seconds is required to torch heat thin gauge (.020" thick) chromium stainless steel to a temperature above 1700° F. and effect the required intergranular oxide penetration thereof. Proportionally longer times are required as the thickness of the chromium stainless steel increases from thin gauge strip up to plate thicknesses. Where induction heating is employed it is preferred to direct a stream of oxygen onto the localized heated area to accelerate the oxidation of the heated surface thereof.

After the area to be brazed is oxidized with an accompanying intergranular penetration of not less than .00025" as just described, the chromium stainless steel is treated to remove the oxides including the intergranular oxides therefrom to provide a surface which is relatively rough as compared to the initial surface condition of the steel and provide intergranular spaces for receiving the brazing solder through capillary action during the brazing operation. In practice it is preferred to subject the oxidized surface area to the action of a pickling solution such as a 2% HF+10% HNO₃ or 2% HF+10% HCl aqueous solution to effective remove the oxides including the intergranular oxides.

When the oxides including the intergranular oxides are thus removed from the area which is to be brazed, silver solder is applied to such area at a temperature above the melting point of the solder to effect a flow of the silver solder over said surface area to cover the treated area and to effect a penetration of the spaces formed by the removal of the intergranular oxides to thereby form a strong adherent bond between the brazing solder and the deoxidized surface of the chromium stainless steel. All of the known silver solders ranging from the basic silver solder composed of 72% silver and 28% copper having a melting point of 1430° F. to its many modifications having additions of copper, manganese, zinc, cadmium, tin and nickel to modify the melting point and physical characteristics of the basic solder are found to be satisfactory in making a joint with the chromium stainless steel when the surface of the chromium stainless steel is treated in the manner described. The melting points of such solders range from about 1150° F. up to about 1600° F. and the solders are well known being thoroughly described in the trade and patent literature.

In applying silver solder to the prepared surface having the intergranular spaces therein as described hereinbefore, it is preferred to utilize a flux having a fluoride base, a satisfactory flux being that sold to the trade under the name of "Handy Flux" by Handy and Harman. Such flux is very effective also in eliminating or removing oxides including the intergranular oxides from the heated surface of the chromium stainless steel.

In a number of cases it has been found that by merely applying the fluoride base flux to the oxidized surface of the chromium stainless steel the action of the flux is sufficient for eliminating the intergranular oxides. However, in order to be certain that a good joint will be made, it is preferred that the pickling treatment described hereinbefore be utilized prior to the application of the flux as in some rare cases it is found that the root of the penetrating oxide which is buried deep below the surface of the chromium stainless steel is not fluxed out or removed unless a thorough pickling in a hydrofluoric acid type of solution as referred to hereinbefore is applied prior to the application of the flux.

While it has been stated hereinbefore that the surface of the chromium stainless steel must be heated in an oxidizing atmosphere to a temperature of at least 1700° F. it is, of course, apparent that such heating at the temperature above 1700° F. will vary somewhat depending upon the composition of the chromium stainless steel. For example, in a type 430 stainless steel having a titanium content in an amount about seven times that of the carbon content it is found that it is necessary in effecting the desired intergranular oxide penetration to heat the steel at a temperature about 100° F. higher than that of the corresponding type 430 stainless steel which does not contain titanium. In no case, however, will the required intergranular oxide penetration of the chromium stainless steel occur if the oxidizing temperature is less than 1700° F.

In order to illustrate the effects of the treatment of this invention reference may be had to the photomicrographs of the drawings. In Figure 1 there is illustrated a photomicrograph at a magnification of 250 times of a type 430 stainless steel which has been heated for 20 minutes in an air furnace at 1900° F. and is unetched, the intergranular oxide penetration being quite pronounced and advanced under such conditions of heating. On the other hand if the temperature in the air furnace is reduced to 1800° F. the oxide penetration will be considerably decreased.

The decrease in the oxide penetration obtained by reducing the oxidizing temperature is better illustrated in Figure 2 of the drawing which is a photomicrograph at a magnification of 500 times of a type of 430 stainless steel which was first heated at 1800° F. in an air furnace and then pickled in a solution of 2% HF+10% HNO$_3$ and then silver soldered with solder sold to the trade under the name of "Easy-Flo" having a composition of 50% silver, 15.5% copper, 16.5% zinc and 18% cadmium and having a melting point of 1160° F. In this example it is quite evident that the oxide penetration is to a sufficient depth to provide an interlocking of the silver solder with the treated surface of the stainless steel so that a strong adherent bond is effected between the silver solder and the treated surface of the stainless steel.

Figure 3 of the drawing illustrates the type of bond obtained between silver solder and the surface of a bright finish chromium stainless steel when a brazing torch is utilized for effecting the initial oxidation of the stainless steel surface. Figure 3 is a photomicrograph at a magnification of 500 times of a joint formed between a type 430 stainless steel which was subjected to the action of an oxidizing flame from a brazing torch for a few seconds (20 to 30) to heat the steel to a temperature above 1700° F., the surface being thereafter immediately pickled with a 2% HF+10% HNO$_3$ aqueous solution, and "Easy-Flo" solder of the same composition as that employed in the example of Figure 2. As in the previous case a strong adherent effective bond is obtained between the brazing alloy and the chromium stainless steel.

In order to emphasize the improved bond effected between silver solder and chromium stainless steel treated in accordance with this invention and untreated chromium stainless steel, reference may be had to Figure 4 of the drawing in which the number 10 identifies an untreated stainless steel having a BB finish and which has been degreased, 12 represents the same type of chromium stainless steel which has been treated by heating it for a few seconds (20 to 30) with a short oxidizing flame from a brazing torch and then pickled in a 2% HF+10% HNO$_3$ aqueous solution, the treated surface of the stainless steel 12 being bonded by "Easy-Flo" silver solder 14 to the untreated surface of the stainless steel strip 10. As is quite evident from the photomicrograph the treated surface of the chromium stainless steel 12 is effectively bonded by an interlocking penetration of the silver solder 14, whereas no penetration is obtained between the silver solder 14 and the surface of the untreated chromium stainless steel strip 10. In practice when tested in a humid atmosphere the bond between the silver solder 14 and the untreated surface of the stainless steel 10 fails in 4 days, whereas the bond between the silver solder 14 and the treated surface of the chromium stainless steel 12 is unaffected after months of exposure to a humid atmosphere or immersed in water.

While it is not known exactly what happens to the structure of the chromium stainless steel when heated in the oxidizing atmosphere as described hereinbefore, it is thought that there is a formation of austenite along the grain boundaries at the high temperatures involved which transforms into martensite upon cooling. This condition of the steel destroys the intergranular corrosion resistance of the chromium stainless steel so that it becomes necessary in effecting the brazing of the silver soldered joint such as described hereinbefore to make certain that the brazing alloy covers the entire surface area which has been subjected to the high temperature treatment, such silver solder coating over the brazing area being very adherent to the chromium stainless steel and preventing corrosion and destruction of the surface area when later exposed to humid atmospheres. It is therefore preferred to utilize localized heating in the area only immediately adjacent where the joint is to be made so that an excess of silver solder will not appear on the surface of the stainless steel. The resulting silver soldered joint is quite strong being capable of being bent backward upon itself without disrupting the bond between the solder and the treated surface of the chromium stainless steel.

What is claimed is:

1. The process of silver brazing chromium stainless steel, comprising, in combination, the steps of, heating a predetermined surface area of the chromium stainless steel to be brazed to a temperature in the range of 1700° F. up to about the melting temperature of the steel in an oxidizing atmosphere to effect an intergranular oxide penetration of said surface area to a depth of not less than 0.00025 inch, subjecting said surface area to the action of a fluoride containing material to remove the intergranular oxides from said surface area to provide spaces therein, and applying silver solder to the treated surface area at a temperature between the melting point of the solder and 1600° F. to effect a flow of the silver solder over said surface area with an accompanying intergranular penetration of the spaces formed by the removal of the intergranular oxides to thereby form a strong adherent bond with the chromium stainless steel.

2. The process of silver brazing chromium stainless steel having a smooth bright finish surface comprising, in combination, the steps of, heating a predetermined surface area of the chromium stainless steel to be brazed to a temperature in the range of 1700° F. up to about the melting temperature of the steel in an oxidizing atmosphere to effect an intergranular oxide penetration of said surface area to a depth of not less than 0.00025 inch, cooling said surface area, subjecting said surface area to the action of a fluoride containing material to remove the intergranular oxides from said surface area to provide spaces therein, and applying silver solder to the treated surface area at a temperature of 1150° F. to 1600° F. to effect a flow of the silver solder over said surface area to cover the treated area, the silver solder flowing into the spaces formed by the removal of the intergranular oxides and forming a strong adherent bond with the chromium stainless steel.

3. The process of silver brazing chromium stainless steel having a smooth bright finish surface comprising, in combination, the steps of, heating a predetermined surface area of the chromium stainless steel to be brazed to a temperature in the range of 1700° F. up to about the melting temperature of the steel in an oxidizing atmosphere to effect an intergranular oxide penetration of said surface area to a depth of not less than 0.00025 inch, cooling said surface area, pickling said predetermined surface area in a hydrofluoric acid solution to remove the oxides including the intergranular oxides from said surface area, the removal of the oxides including the intergranular oxides providing an irregular surface area having irregular spaces therein of a depth equivalent to the oxide penetration, and applying silver solder to the treated surface area at a temperature of 1150° F. to 1600° F. to effect a flow of the silver solder over said surface area to cover the treated area, the silver solder flowing into the spaces formed by the removal of the intergranular oxides and effectively bonding with the chromium stainless steel.

4. The process of silver brazing chromium stainless steel having a smooth bright finish surface comprising, in combination, the steps of, heating a predetermined surface area of the chromium stainless steel to be brazed to a temperature in the range of 1700° F. up to about the melting temperature of the steel in an oxidizing atmosphere to effect an intergranular oxide penetration of said surface area to a depth of not less than 0.00025 inch, cooling said surface area, applying a fluoride flux to cover the predetermined surface area, heating the predetermined surface area to a temperature not less than 1150° F. to effect a reaction of the flux and the oxides of said surface area as said surface area is being heated to remove the oxides including the intergranular oxides from said surface area, the removal of the oxides providing said surface area with an irregular surface having spaces therein of a depth equivalent to the oxide penetration, and applying silver solder to said surface area while maintaining the temperature thereof at not less than 1150° F. to melt the solder and effect a flow thereof over said surface area to cover the treated area, the silver solder filling the spaces formed by the removal of the intergranular oxides and effectively bonding with the chromium stainless steel.

5. The process of silver brazing chromium stainless steel having a smooth bright finish surface comprising, in combination, the steps of, heating a predetermined surface area of the chromium stainless steel to be brazed to a temperature of from 1700° F. up to about the melting temperature of the steel in an oxidizing atmosphere to effect an intergranular oxide penetration of said surface area to a depth of not less than 0.00025 inch, cooling said surface area, pickling said surface area in a hydrofluoric acid solution, applying a fluoride flux to cover said surface area, heating said surface area to a temperature of not less than 1150° F., the hydrofluoric acid solution treatment and the fluoride flux cooperating to effect the removal of and maintain said surface area free from the oxides including the intergranular oxides, the removal of the oxides providing said surface area with an irregular surface having spaces therein of a depth equivalent to the oxide penetration, and applying silver solder to said surface area while maintaining the temperature thereof at a temperature of 1150° F. to 1600° F. to effect a flow of the silver solder over said surface area with an accompanying intergranular penetration of the spaces formed by the removal of the intergranular oxides to thereby form a strong adherent bond with the chromium stainless steel.

References Cited in the file of this patent

UNITED STATES PATENTS

| Number | Name | Date |
|---|---|---|
| 2,126,074 | Wissler | Aug. 9, 1938 |
| 2,368,128 | Pinkbone et al. | Jan. 30, 1945 |
| 2,430,475 | Marshall | Nov. 11, 1947 |
| 2,442,485 | Cook | June 1, 1948 |